(12) United States Patent
Kramer et al.

(10) Patent No.: US 7,843,946 B2
(45) Date of Patent: Nov. 30, 2010

(54) METHOD AND SYSTEM FOR PROVIDING VIA A DATA NETWORK INFORMATION DATA FOR RECOVERING A CLOCK FREQUENCY

(75) Inventors: Ronalf Kramer, Oberhaching (DE); Stefan Honken, Unterhaching (DE)

(73) Assignee: Lantiq Deutschland GmbH, Neubiberg (DE)

( * ) Notice: Subject to any disclaimer, the term of this patent is extended or adjusted under 35 U.S.C. 154(b) by 918 days.

(21) Appl. No.: 11/560,177

(22) Filed: Nov. 15, 2006

(65) Prior Publication Data

US 2008/0112437 A1 May 15, 2008

(51) Int. Cl.
*H04J 3/06* (2006.01)
(52) U.S. Cl. .................................. 370/395.62; 370/503
(58) Field of Classification Search ........................ None
See application file for complete search history.

(56) References Cited

U.S. PATENT DOCUMENTS

| | | | | |
|---|---|---|---|---|
| 6,363,073 | B2 * | 3/2002 | Nichols | 370/395.62 |
| 2003/0081147 | A1 * | 5/2003 | Zimmermann | 348/500 |
| 2003/0169776 | A1 | 9/2003 | Reesor | 370/503 |
| 2004/0062278 | A1 * | 4/2004 | Hadzic et al. | 370/503 |
| 2004/0258099 | A1 | 12/2004 | Scott et al. | 370/503 |
| 2005/0100054 | A1 | 5/2005 | Scott et al. | 370/503 |
| 2006/0291479 | A1 * | 12/2006 | Sasson et al. | 370/395.62 |

FOREIGN PATENT DOCUMENTS

| | | |
|---|---|---|
| DE | 103 10 102 A1 | 11/2003 |
| GB | 2 392 588 A | 3/2004 |
| GB | 2 399 263 A | 9/2004 |
| WO | 00/28666 A1 | 5/2000 |

* cited by examiner

*Primary Examiner*—Chirag G Shah
*Assistant Examiner*—Minh-Trang Nguyen
(74) *Attorney, Agent, or Firm*—Eschweiler & Associates, LLC (57) ABSTRACT

At an ingress interface of a data network first information data are generated, at an egress interface of the data network second information data are generated, correction data are generated on the basis of the second information data, and at the egress interface a clock frequency is recovered on the basis of the first information data and the correction data.

40 Claims, 4 Drawing Sheets

METHOD AND SYSTEM FOR PROVIDING VIA A DATA NETWORK INFORMATION DATA FOR RECOVERING A CLOCK FREQUENCY

TECHNICAL FIELD

The present invention relates to a method of providing via a data network information data for recovering a clock frequency, a method of synchronizing first and second clock frequencies provided respectively on ingress and egress interfaces of a data network, a method of recovering a clock frequency at an egress interface of a data network, a system for providing via a data network information data for recovering a clock frequency, a system for synchronizing first and second clock frequencies provided respectively on ingress and egress interfaces of a data network, an apparatus for recovering a clock frequency at an egress interface of a data network, and an apparatus for providing via a data network information data for recovering a clock frequency.

BACKGROUND

In recent years, different types of communication networks have been developed to carry various types of information. Communication networks typically make use of one of two well-established transmission mechanisms, namely the circuit switched transfer and the packet-switched transfer. The older networks like telephone networks for voice communication are primarily circuit switched networks. In a circuit switched network, each call establishes a dedicated point-to-point connection through the network which, for instance, allows people at both ends of a telephone call to speak and listen at the same time.

A circuit remains open for the entire duration of a call even if no one is speaking, which means that a significant amount of circuit's bandwidth, or capacity to carry information, is wasted on silence, or meaningless data. In order to utilize the capacity more efficiently, circuit switched telecommunication networks have made use of time division multiplexed (TDM) circuits to interconnect network switches. In TDM, analog signals are digitally coded and multiplexed in time over circuits at a constant bit rate.

The wide spread use of computers in the last decades has led to the development of additional types of networks. These networks have been configured for the purpose of data communications and are primarily packet-switched networks. In a packet-switched network, a call may consist of a stream of data sent from one computer to another. The stream of data is divided up into packets before it enters the network. At the destination, the stream of data is re-assembled from the packets. Thus packet-switched networks typically do not allocate fixed resources to transmitters, but rather route packets of data on a best efforts basis using destination address information contained in packet headers, and network switches and routers.

A packet-switched call therefore does not require a dedicated connection through the network. Instead, packets from many different calls can share the same bandwidth. That is, packets from one call can be inserted into spaces between packets from other calls. For these reasons, packet-switched networks efficiently utilize much more network bandwidth than circuit-switched networks, making packet-switched networks particularly suited to handle large volumes of data.

Packet-switched networks are becoming more popular amongst network operators as they often provide better performance, and are more cost effective to install and maintain than equivalent circuit-switched networks. Moreover, for the above-mentioned reasons of performance and cost, many operators and leased line providers who provide bandwidth to service providers are moving towards replacing TDM sources with packet networks. In many cases, switch-to-switch communications will be provided entirely over packet networks. However, it is likely that for many years to come, some operators will continue to rely upon TDM circuits to provide all or at least a part of the networks. This will bring about a constant need for interworking methods and systems between packet networks and TDM systems.

Packet-switched networks, however, normally do not work well for time critical transmissions such as voice. For instance, in packet-switched networks, packets may experience delay variations while traveling through the network. As a result, packets are rarely received at a constant bit rate. In data communications, delay variations between packets usually do not matter. A computer can just wait for a complete set of packets to arrive before processing the data. For time critical transmissions, however, delay variations can have a significant impact on the quality of the call. In such case, circuit-switched networks like TDM are generally better suited for constant bit rate, time critical transmissions such as voice communication.

In general, TDM links are synchronized circuits with a constant (transmission) bit rate governed by a service clock operating at some pre-defined frequencies. In contrast, in a packet network there is no direct link between the frequency at which packets are sent from an ingress port of the network and the frequency at which they arrive at an egress port of the network. In order to provide a TDM circuit emulation, there must be provided at the ports of the packet network an interworking between the TDM links and the packet network in such a way that the TDM link at the ingress side is synchronized with the TDM link at the egress side. That is to say, that the TDM service frequency at the customer premises on the ingress side must be exactly reproduced at the egress side of the packet network. The consequence of any long-term mismatch in these frequencies will be that the queue, for example, in a buffer memory etc., at the egress of the packet network will either fill-up or empty, depending upon whether the regenerated clock is slower or faster than the original clock, causing loss of data and degradation of the service. Also, unless the phase of the original clock is tracked by that of the regenerated clock, a lag in frequency tracking will result in small but nonetheless undesirable changes to the operating level of the queue at the egress.

BRIEF DESCRIPTION OF THE DRAWINGS

Embodiments are better understood with reference to the following drawings.

DETAILED DESCRIPTION

The aspects and embodiments are described with reference to the drawings, wherein like reference numerals are generally utilized to refer to like elements throughout. In the following description for purposes of explanation numerous specific details set forth in order to provide a thorough understanding of one or more aspects of embodiments. It may be evident, however, to one skilled in the art that one or more aspects of the embodiments may be practiced with a lesser degree of the specific details. In other instances, known structures and apparatuses are shown in block diagram form in order to facilitate describing one or more aspects of the embodiments. The following description is therefore not to be taken in a limiting sense, and the scope of the invention is defined by the appended claims.

Figure 1:
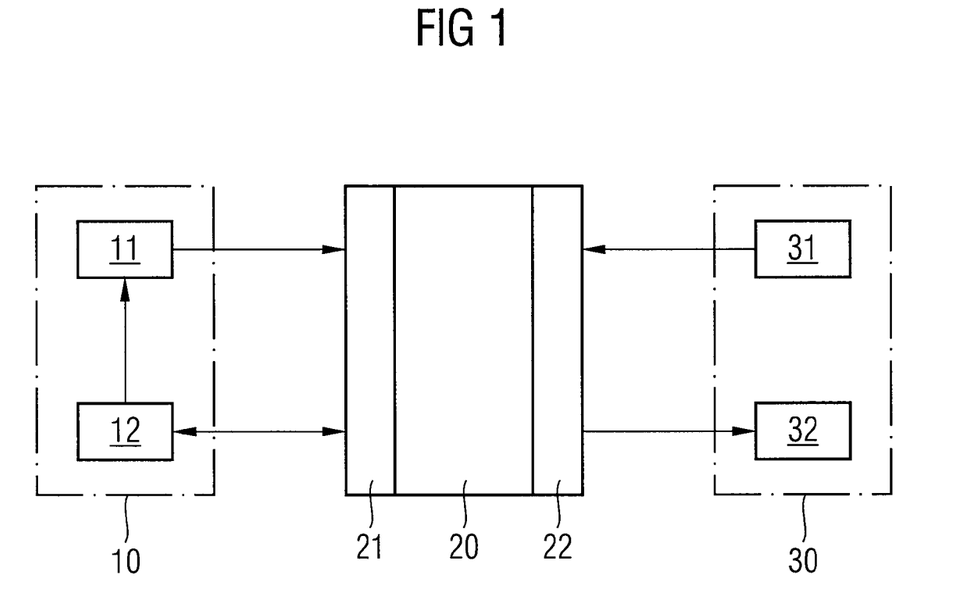
FIG. 1 is a block diagram for illustrating an embodiment of a system.

Referring to FIG. 1 there is shown a block diagram for illustrating an embodiment of a system. A data network 20 is used to transmit data from one entity to another entity. In the present embodiment a transmitter entity or transmission entity 10 is coupled to the data network 20 in order to send data to the data network 20 and a receiver entity or reception entity 30 is coupled to the data network 20 in order to receive data from the data network 20. In particular, the transmission entity 10 is coupled to an ingress interface 21 of the data network 20 and the reception entity 30 is coupled to an egress interface 22 of the data network 20. The transmission entity 10, for example, can be a TDM transmission entity. The reception entity 30, for example, can be as well a TDM reception entity. The data network 20, for example, can be a packet-switched network. The interfaces 21 and 22 may comprise interworking function blocks that provide for rate adaptation and protocol conversion between the TDM system and the packet-switched system.

The system comprises means for generating first information data integrated within the transmission entity 10 and designated with the reference sign 11. The first information data, for example, can be timestamps and the means for generating first information data can be implemented as a timestamp generator 11. The timestamp generator 11 is part of the transmission entity 10 and is coupled to the ingress interface 21 of the data network 20. In the transmission entity 10 a transmitter, in particular a TDM transmitter, is provided for transmitting payload data to the data network 20. The nature of the data stream is not relevant, although it could, for example, be a voice call, a video conference call or a data call. The timestamp generator 11 inserts timestamps into the data stream. In particular, if the data network 20 is a packet-switched network, a timestamp is inserted into each data packet. The TDM transmitter transmits data with a constant bit rate governed by a service clock operating at a pre-defined service clock frequency fsource.

The system further comprises means for generating second information data integrated within the environment of a reception entity 30 and designated with the reference sign 31. This second information data can be, for example, an information about a reference frequency frefnt. Within the reception entity 30 recovering means 32 are provided for recovering the clock frequency fsource as will be explained later. For this purpose a receiver reference frequency frefnt is generated by a receiver reference frequency generator (not shown) and supplied to the recovering means. The receiver reference frequency frefnt is supplied to a receiver PLL (phase-locked loop) for recovering the service clock frequency fsource by utilizing the first information data. The output frequency of the receiver PLL is denominated as fdest. The receiver reference frequency frefnt is not necessarily equal to the transmitter reference frequency freflt. Therefore, according to one embodiment the second information data is comprised of an information about the receiver reference frequency frefnt. The means for generating second information data accordingly comprises means for generating an information about the receiver reference frequency frefnt. Such information can also be transmitted in the form of timestamps so that the means for generating second information data can be implemented as a timestamp generator 31. The second information data are transmitted to the egress interface 22 of the data network 20 and they are addressed so as to be transmitted to the transmission entity 10.

The system further comprises means for generating correction data integrated within the transmission entity 10 and designated with the reference sign 12. The correction data are generated on the basis of the second information data. If the second information data are comprised of an information about the receiver reference frequency frefnt then the means for generating correction data are supplied with an information about the transmitter reference frequency freflt so that the means for generating correction data can determine the difference or deviation between both reference frequencies. On the basis of this comparison the correction data are generated. The correction data can be of different nature. In one embodiment the correction data are such that the first information data, in particular timestamps, e.g. generated by a timestamp generator 11, are corrected. This correction can be performed within transmission entity 10 (see arrow from means 12 to means 11). This correction can also be performed within the reception entity 30 so that the first information data are transmitted without any correction to the receiver entity 30 and the correction data are also transmitted to the receiver entity 30 and the correction of the first information data is performed within the receiver entity 30. In a further embodiment the first information data are not corrected and the correction data are transmitted to the receiver entity 30 and within the receiver entity 30, the reference frequency is corrected on the basis of the correction data.

The system further comprises means for recovering a clock frequency integrated within the receiver entity 30 and designated with the reference sign 32. The clock frequency, i.e. the service clock frequency fsource, is recovered on the basis of the first information data and the correction data. As described earlier, the means for recovering can comprise a PLL supplied with the receiver reference frequency frefnt to deliver an output frequency fdest. The means for recovering are also supplied with the first information data. If the correction data are comprised of corrected first information data, in particular corrected timestamps, then the corrected first information data are supplied to the means for recovering. In such a case, the receiver reference frequency frefnt will be supplied to the means for recovering as it was generated by the reference generator. If, however, the correction data are comprised of a corrected value of the reference frequency, then the receiver reference frequency frefnt as generated by the reference frequency generator will be corrected and supplied to the means for recovering and the first information data will be supplied to the means for recovering in the same form as they were transmitted from the transmission entity 10.

It is also possible that the means 12 for generating correction data are provided within the environment of the reception entity 30 instead of being provided within the environment of the transmission entity 10, as depicted in FIG. 1. In such a case, it would be necessary that the frequency value of the transmitter reference frequency freflt will be transmitted from the transmitter entity 10 to the receiver entity 30 so that the comparison between both reference frequencies could be performed within the receiver entity 30 by the means 12 for generating correction data.

One important advantage of the embodiment according to FIG. 1 is that in the receiver entity 30 a reference generator for generating a reference frequency frefnt can be employed the nominal output frequency of which does not need to correspond to the transmitter reference frequency freflt. Therefore, the frequency generator for the receiver reference frequency frefnt can be of a simple and cheap construction. The reference frequencies frefnt and freflt can deviate from each other and they can vary slowly with respect to each other. Due to the correction mechanism the recovered frequency fdest will correspond with the service clock frequency fsource so that fsource can be recovered at the receiver entity 30 with a high precision.

Figure 2:
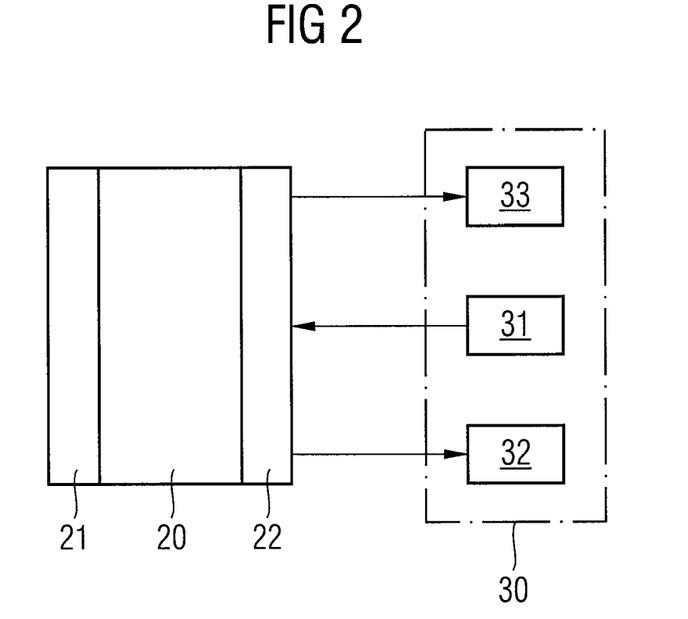
FIG. 2 is a block diagram for illustrating an embodiment of an apparatus.

Referring to FIG. 2, there is shown a block diagram for illustrating an embodiment of an apparatus. The apparatus is arranged within the environment of a receiver entity 30 which is coupled to an egress interface 22 of a data network 20. Those elements with the same reference numerals as elements in FIG. 1 will have the same properties and functionalities as was explained above in connection with FIG. 1. In addition the apparatus as depicted in FIG. 2 comprises means for receiving first information data designated with the reference sign 33. Such means 33 need not be implemented in an own circuit block as depicted in FIG. 2. Instead it can also be part of the recovering means 31. The means 33 can also comprise a correction device which receives uncorrected first information data and corrects them on the basis of the correction data.

Figure 3:
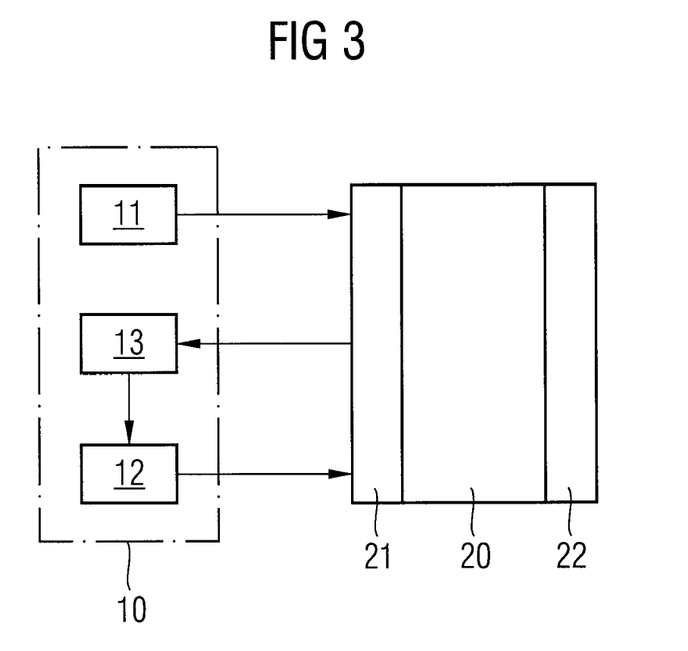
FIG. 3 is a block diagram for illustrating a further embodiment of an apparatus.

Referring to FIG. 3, there is shown a block diagram for illustrating an embodiment of an apparatus. Those elements with the same reference numerals as elements in FIG. 1 will have the same properties and functionalities as was explained above in connection with FIG. 1. In addition, the apparatus as depicted in FIG. 2 comprises means for receiving second information data designated with the reference sign 13. The means 13 are connected with the means 12 to supply the second information data to the means 12. However, the means 13 can also be part of means 12.

Figure 4:
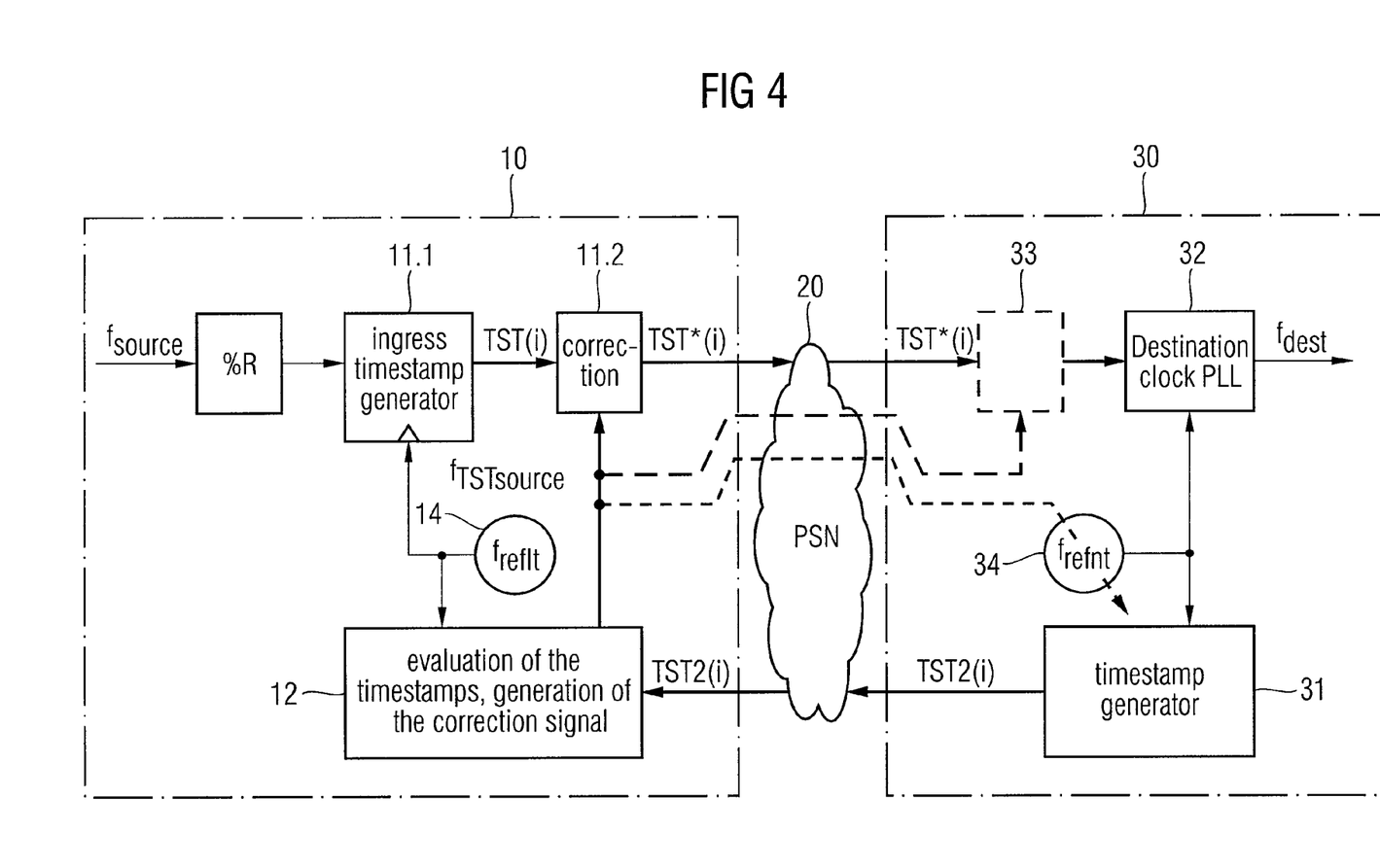
FIG. 4 is a block diagram for illustrating a further embodiment of a system.

Referring to FIG. 4, there is shown a block diagram for illustrating an embodiment of a system. The system of this embodiment is in principle the same as the embodiment of FIG. 1, but is implemented in a more detailed manner. A transmitter entity 10 is coupled to a packet-switched network (PSN) 20 for transmitting data via the PSN 20 to a receiver entity 30 which is also coupled to the PSN 20. A reference frequency generator 14 is provided in the transmitter entity 10 for generating a transmitter reference frequency freflt. A reference frequency generator 34 is provided in the receiver entity 30 for generating a receiver reference frequency frefnt which is used for generating the frequency fdest which is to be synchronized with the service clock frequency fsource. For this purpose an output of the receiver reference frequency generator 34 is coupled to an input of a destination clock PLL 32 and also to an input of a timestamp generator 31.

In the timestamp generator 31 timestamps TST2($i$) are generated in a way so as to represent the frequency value of the receiver reference frequency frefnt. For example, the transmission of the second information data (timestamps TST2) corresponds to the reference frequency frefnt. The timestamps TST2($i$) are transmitted via the PSN 20 to the transmitter entity 10. In the transmitter entity 10, the timestamps TST(i) are received by a circuit block 12 in which the timestamps TST2($i$) are evaluated and a correction signal is generated. An input port of the circuit block 12 is connected to the transmitter reference frequency generator 14. In the circuit block 12 the two reference frequencies freflt and frefnt are compared and the correction signal is generated on the basis of the result of the comparison.

There are three different ways of taking into account a deviation between the two reference frequencies and to perform a respective correction. The first way is to correct the time stamps TST(i) as generated in an ingress timestamp generator 11.1 in a timestamp correction device 11.2. The correction signal of the circuit block 12 contains an information on how to correct the timestamps TST(i). The correction signal is output by the circuit block 12 and input into the correction device 11.2. In the correction device 11.2 corrected timestamps TST*(i) are generated and transmitted via the PSN 20 to the receiver entity 30. In the receiver entity 30 the corrected timestamps TST*(i) are directly input into the destination clock PLL 32.

The second way of correcting is similar to the first way. However, the timestamps TST(i) as generated by the ingress timestamp generator 11.1 are transmitted uncorrected via the PSN 20 to the receiver entity 30. In the receiver entity 30 there is provided a correction device 33 which receives the uncorrected timestamps TST(i). The correction device 33 also receives the correction signal from the circuit block 12 which has been transmitted via the PSN 20 (broken line from circuit block 12 to correction device 33). The correction device 33 receives the uncorrected timestamps TST(i) and generates corrected timestamps TST*(i) and outputs the corrected timestamps TST*(i) to the destination clock PLL 32. As described in the first and second ways of correcting, only the timestamps TST(i) are corrected, but the receiver reference frequency frefnt generated by the receiver reference frequency generator 34 is not corrected.

In the third way of correcting, the timestamps TST(i) are left uncorrected so that the correction devices 11.2 or 33 are not provided. Instead the correction signal as delivered by the circuit block 12 is of such a nature that it contains an information on how the receiver reference frequency should be changed so as to correspond to the transmitter reference frequency freflt. Such a correction signal is output by the circuit block 12 and transmitted via the PSN 20 to the receiver reference frequency generator 34 of the receiver entity 30 (broken line between circuit block 12 and receiver reference frequency generator 34).

Figure 5:
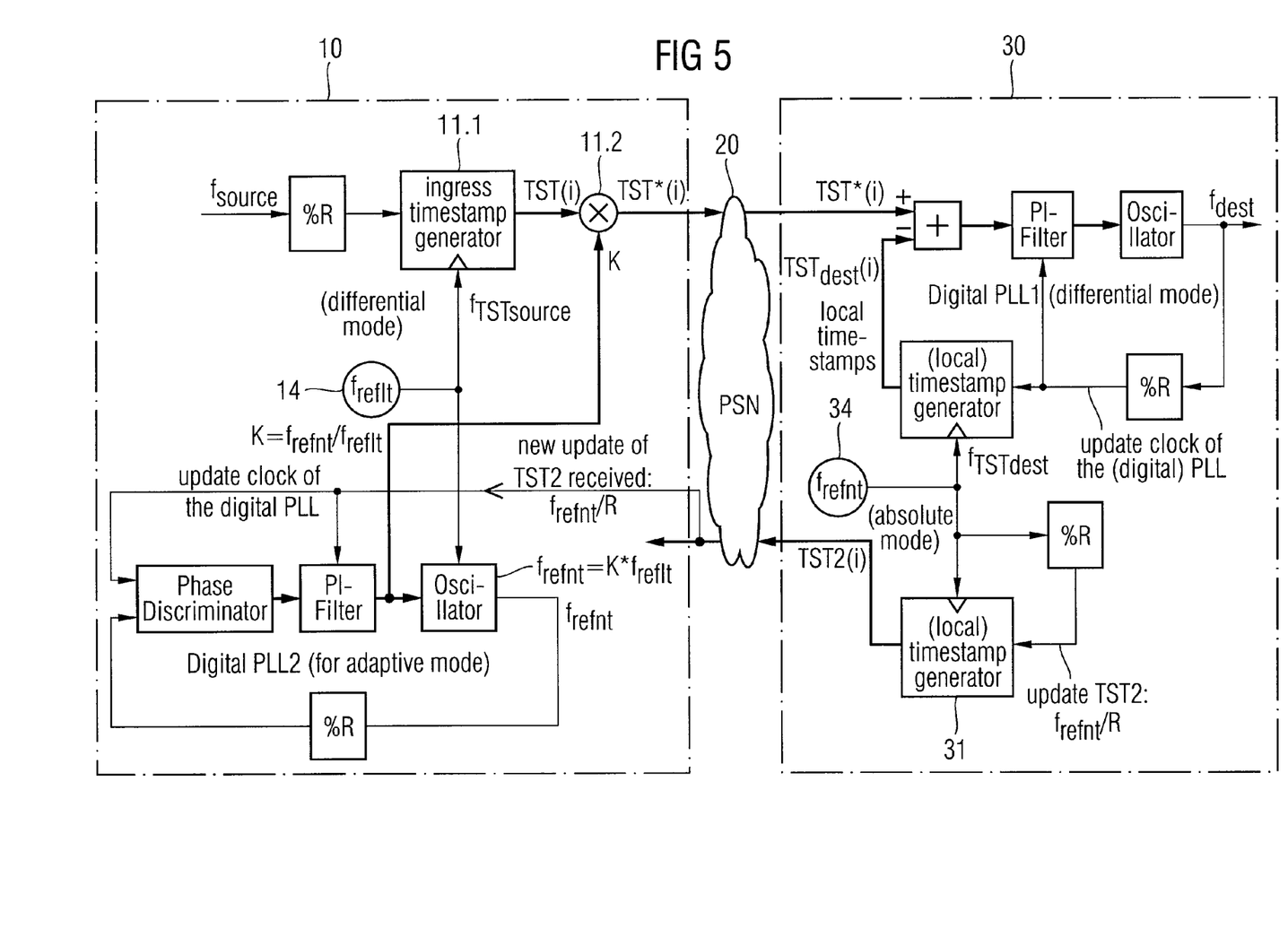
FIG. 5 is a block diagram for illustrating a further embodiment of a system.

Referring to FIG. 5, there is shown a block diagram for illustrating a further embodiment of a system. In this embodiment timestamps TST2($i$) are generated in the timestamp generator 31 and transmitted via the PSN 20 to the transmitter entity 10. In the transmitter entity 10 the reference frequency frefnt of the receiver entity 30 is reconstructed with the digital PLL 2. In the digital PLL 2 a correction value K is generated. The correction value K is supplied to a multiplier 11.2 in which the timestamps TST(i) as generated by the ingress timestamp generator 11.1 are multiplied with the correction value K.

The digital PLL 2 comprises a phase discriminator, a proportional-integral (PI-) filter, an oscillator and a divider (division factor R). The transmitter reference frequency freflt as generated by the transmitter reference frequency generator 14 is input into the oscillator of the digital PLL 2. The output of the oscillator is divided by the factor R and the output of the divider is input into a first input port of the phase discriminator. The received timestamps TST2($i$) are input in the second input port of the phase discriminator. The output of the PI-filter is given by the correction value K wherein K=frefnt/freflt.

The corrected timestamps TST*(i) are transmitted via the PSN 20 to the receiver entity 30. In the receiver entity 30 the corrected timestamps TST*(i) are input into the positive input port of a phase discriminator of a digital PLL 1. The digital PLL 1 also comprises a timestamp generator the output of which is input into the negative input port of the phase discriminator. The timestamp generator of the digital PLL 1 receives the reference frequency frefnt as generated by the receiver reference frequency generator 34.

As soon as after starting the system both digital PLL's operate in a steady state, the reconstructed frequency fdest will be the same as the original service clock frequency fsource independent of the static frequency difference between the transmitter reference frequency frefIt and the receiver reference frequency frefnt.

What is claimed is:

1. A method of providing via a data network information data for recovering a clock frequency, comprising:
    generating first information packetized data at an ingress interface of a data network, wherein the data network comprises a packet-switched data network, generating second information packetized data at an egress interface of the data network,
    generating correction data on the basis of the second information packetized data,
    generating corrected first information data on the basis of the first information packetized data and the correction data,
    transmitting at least one of the first information packetized data and the corrected first information data from the ingress interface of the data network through the packet-switched data network to the egress interface of the data network, and
    recovering a clock frequency at the egress interface on the basis of said corrected first information data.

2. The method according to claim 1, further comprising: said first information packetized data comprising timestamps.

3. The method according to claim 1, further comprising: said second information packetized data comprising an information about a reference frequency.

4. The method according to claim 1, further comprising: said correction data comprising corrected frequency value of a reference frequency.

5. The method of claim 1, wherein the corrected information data are generated at the ingress interface.

6. The method of claim 1, wherein the corrected information data are generated at the egress interface.

7. A method of synchronizing first and second clock frequencies provided respectively on ingress and egress interfaces of a data network, comprising:
    generating a first clock frequency at an ingress interface of a data network, wherein the data network comprises a packet-switched data network,
    generating a second clock frequency at an egress interface of the data network,
    generating first information packetized data at the ingress interface,
    generating second information packetized data at the egress interface,
    generating correction data on the basis of the second information packetized data,
    generating corrected first information data on the basis of the first information packetized data and the corrected data,
    transmitting at least one of the first information packetized data and the corrected first information data from the ingress interface of the data network through the packet-switched data network to the egress interface of the data network, and
    synchronizing the second clock frequency to the first clock frequency on the basis of said first information data and said correction data.

8. The method according to claim 7, further comprising: said first information packetized data comprising timestamps.

9. The method according to claim 7, further comprising: said second information packetized data comprising an information about a reference frequency.

10. The method according to claim 7, further comprising: said correction data comprising a corrected value of a reference frequency.

11. A method of recovering a clock frequency at an egress interface of a data network, comprising:
    receiving at an egress interface of a data network first information packetized data from an ingress interface of the data network, wherein the data network comprises a packet-switched data network,
    generating second information packetized data at the egress interface,
    generating correction data on the basis of the second information packetized data,
    generating corrected first information data on the basis of the first information packetized data and the correction data,
    transmitting at least one of the first information packetized data and the corrected first information data from the ingress interface of the data network through the packet-switched data network to the egress interface of the data network,
    recovering a clock frequency on the basis of said corrected first information data.

12. The method according to claim 11, further comprising: said second information packetized data comprising an information about a reference frequency.

13. The method according to claim 11, further comprising: said correction data comprising a corrected frequency value of a reference frequency, and recovering a clock frequency comprises using a reference frequency with the corrected frequency value.

14. The method according to claim 11, further comprising: said first information packetized data comprising timestamps, said correction data comprising an information about a correction of the timestamps, and recovering a clock frequency comprises using timestamps which are corrected according to said information about a correction of the timestamps.

15. The method according to claim 14, further comprising: correcting the timestamps according to said information about a correction of the timestamps.

16. The method according to claim 14, further comprising: receiving timestamps which are correcting according to said information about a correction of the time stamps.

17. A method of providing via a data network information data for recovering a clock frequency, comprising:
    generating first information packetized data at an ingress interface of a data network, receiving at the ingress interface second information packetized data from an egress interface of the data network, wherein the data network comprises a packet-switched data network,
    generating at the ingress interface correction data on the basis of the second information packetized data,
    generated corrected first information data on the basis of the first information packetized data and the correction data,
    transmitting at least one of the first information packetized data and the corrected first information data from the ingress interface of the data network through the packet-switched data network to the egress interface of the data network, and recovering a clock frequency at the egress interface on the basis of said corrected first information data.

18. The method according to claim 17, further comprising: said first information packetized data comprising timestamps.

19. The method according to claim 18, further comprising: said correction data comprising an information about a correction of said timestamps.

20. The method according to claim 19, further comprising: said correction data comprising corrected timestamps.

21. The method according to claim 17, further comprising: said correction data comprising an information about a correction of a reference frequency.

22. A system for providing via a data network information data for recovering a clock frequency, comprising:
- means for generating first information packetized data at an ingress interface of a data network, wherein the data network is a packet-switched data network,
- means for generating second information packetized data at an egress interface of the data network,
- means for generating correction data on the basis of said second information packetized data, and
- means for generating corrected first information data on the basis of the first information packetized data and the correction data,
- means for transmitting at least one of the first information packetized data and the corrected first information data from the ingress interface of the data network through the packet-switched data network to the egress interface of the data network, and
- means for recovering a clock frequency at the egress interface on the basis of said corrected first information data and said correction data.

23. The system according to claim 22, further comprising: said means for generating first information packetized data comprising means for generating timestamps.

24. The system according to claim 22, further comprising: said means for generating second information packetized data comprising means for generating an information about a reference frequency.

25. The system according to claim 22, further comprising: said means for generating correction data comprising means for generating corrected first information packetized data.

26. The system according to claim 22, further comprising: said means for generating correction data comprising means for generating a corrected frequency value of a reference frequency.

27. A system for synchronizing first and second clock frequencies provided respectively on ingress and egress interfaces of a data network, comprising:
- means for generating a first clock frequency at an ingress interface of a data network, wherein the data network comprises a packet-switched data network,
- means for generating a second clock frequency at an egress interface of the data network,
- means for generating first information packetized data at the ingress interface,
- means for generating second information packetized data at the egress interface,
- means for generating correction data on the basis of said second information packetized data,
- means for generating corrected first information data on the basis of the first information packetized data and the correction data,
- transmitting at least one of the first information packetized data and the corrected first information data from the ingress interface of the data network through the packet-switched data network to the egress interface of the data network, and
- means for synchronizing the second clock frequency to the first clock frequency on the basis of said first information packetized data and said correction data.

28. The system according to claim 27, further comprising: said means for generating first information packetized data comprising means for generating timestamps.

29. The system according to claim 27, further comprising: said means for generating second information packetized data comprising means for generating an information about a reference frequency.

30. The system according to claim 27, further comprising: said means for generating correction data comprising means for generating corrected first information packetized data.

31. The system according to claim 27, further comprising: said means for generating correction data comprising means for generating a corrected frequency value of a reference frequency.

32. An apparatus for recovering a clock frequency at an egress interface of a data network, comprising:
- means for receiving first information packetized data from an ingress interface of a data network, wherein the data network comprises a packet-switched data network,
- means for generating second information packetized data,
- means for generating correction data on the basis of the second information packetized data,
- means for generating corrected first information data on the basis of the first information packetized data and the correction data,
- means for transmitting at least one of the first information packetized data and the corrected first information data from the ingress interface of the data network through the packet-switched data network to the egress interface of the data network,
- means for recovering a clock frequency on the basis of said corrected first information data.

33. The apparatus according to claim 32, further comprising: means for generating a reference frequency.

34. The apparatus according to claim 33, further comprising: said means for generating second information packetized data comprising means for generating an information about the reference frequency.

35. The apparatus according to claim 33, further comprising: said correction data comprising a corrected value of a reference frequency, and said means for generating a reference frequency being arranged for receiving said corrected value of a reference frequency.

36. The apparatus according to claim 32, further comprising: said first information packetized data comprising timestamps, said correction data comprising an information about a correction of the timestamps, and means for correcting the timestamps on the basis of said information about correcting the timestamps on the basis of said information about a correction of the timestamps.

37. An apparatus for providing via a data network information data for recovering a clock frequency, comprising:
- means for generating first information packetized data,
- means for receiving second information packetized data from an egress interface of the data network, wherein the data network comprises a packet-switched data network, means for generating correction data on the basis of said second information packetized data, means for generating corrected first information data on the basis of the first information packetized data and the correction data, means for transmitting at least one of the first information packetized data and the corrected first information data from the ingress interface of the data network through the packet-switched data network to the egress interface of the data network, and means for recovering a clock frequency at the egress interface on the basis of said corrected first information data.

38. The apparatus according to claim 37, further comprising: said means for generating first information packetized data comprising means for generating timestamps.

39. The apparatus according to claim 37, further comprising: said means for generating correction data comprising means for generating corrected first information data.

40. The apparatus according to claim 37, further comprising: said means for generating correction data comprising means for generating a corrected frequency value of a reference frequency.

* * * * *

UNITED STATES PATENT AND TRADEMARK OFFICE
CERTIFICATE OF CORRECTION

PATENT NO. : 7,843,946 B2
APPLICATION NO. : 11/560177
DATED : November 30, 2010
INVENTOR(S) : Ronalf Kramer et al.

It is certified that error appears in the above-identified patent and that said Letters Patent is hereby corrected as shown below:

Column 9, Claim 22, line 26; Please replace "second information packetized data, and" with --second information packetized data,--

Column 9, Claim 22, line 37; Please remove the phrase "and said correction data."

Signed and Sealed this
Fifteenth Day of February, 2011

David J. Kappos
*Director of the United States Patent and Trademark Office*